United States Patent

Hardeman et al.

Patent Number: 5,267,488
Date of Patent: Dec. 7, 1993

[54] DRIVE TRAIN CONVERSION APPARATUS

[76] Inventors: Michael L. Hardeman, 437 Quill Dr., NW., Cleveland, Tenn. 37312; Michael B. Switter, 265 Moore Cir., NW., Charleston, Tenn. 37310

[21] Appl. No.: 917,305

[22] Filed: Jul. 23, 1992

[51] Int. Cl.⁵ .............................. F16H 57/02
[52] U.S. Cl. .................. 74/606 R; 74/730.1; 74/745; 180/347; 180/364
[58] Field of Search ............. 74/606 R, 745, 730.1; 180/347, 364, 367

[56] References Cited

U.S. PATENT DOCUMENTS

| | | | |
|---|---|---|---|
| 2,256,960 | 9/1941 | Neracher et al. | 74/730.1 X |
| 2,599,773 | 6/1952 | Neracher et al. | 74/745 X |
| 2,647,416 | 8/1953 | Turner et al. | 180/367 X |
| 3,161,015 | 12/1964 | Knowles et al. | 74/730.1 X |
| 3,401,763 | 9/1968 | Rolt | 74/730.1 X |
| 3,517,789 | 6/1970 | Gimmler et al. | 192/3.21 |
| 3,566,999 | 3/1971 | Robinson | 74/730.1 X |
| 3,603,177 | 9/1971 | Burrows | 74/745 |
| 4,641,547 | 2/1987 | Stich et al. | 74/606 R |
| 4,887,344 | 12/1989 | Kurihara et al. | 74/730.1 X |

FOREIGN PATENT DOCUMENTS

| | | | |
|---|---|---|---|
| 1926157 | 11/1978 | Fed. Rep. of Germany | 180/367 |
| 447335 | 5/1936 | United Kingdom | 74/730.1 |
| 533528 | 2/1941 | United Kingdom | 180/367 |

Primary Examiner—Leslie A. Braun
Assistant Examiner—David E. Henn
Attorney, Agent, or Firm—Richard C. Litman

[57] ABSTRACT

A novel housing adapts a clutch for installation in series with a torque converter in modified rear- engined, air-cooled Volkswagen vehicles. The housing provides a rear partial chamber housing the clutch and flywheel, and is interposed between an automatic transmission bell housing and a manual transmission of the vehicle. The housing uses preexisting fasteners to bolt to both the bell housing and the transmission. The clutch and flywheel are driven by the torque converter, and a release bearing is retained within the housing. The housing also bolts to the manual transmission using preexisting fasteners. The manual transmission is modified to include an input shaft from an automatic transmission. The engine is displaced 2.5 inches to the rear. Accelerated wear to the clutch and constant velocity joints is mitigated, while driving characteristics of a manual transmission are retained.

9 Claims, 5 Drawing Sheets

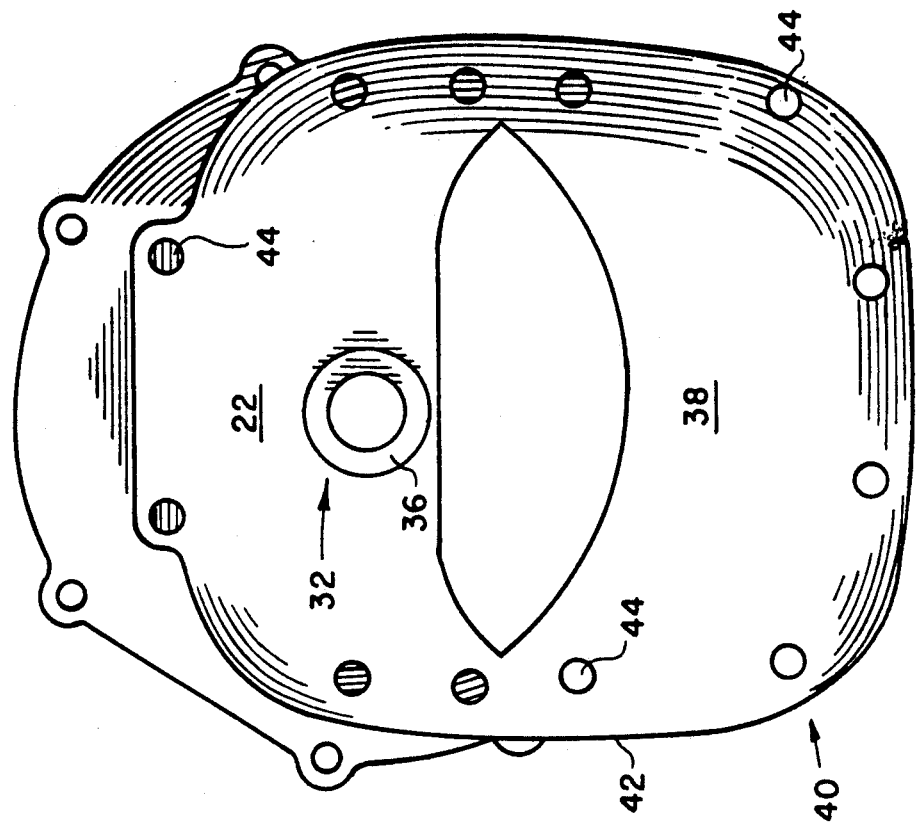
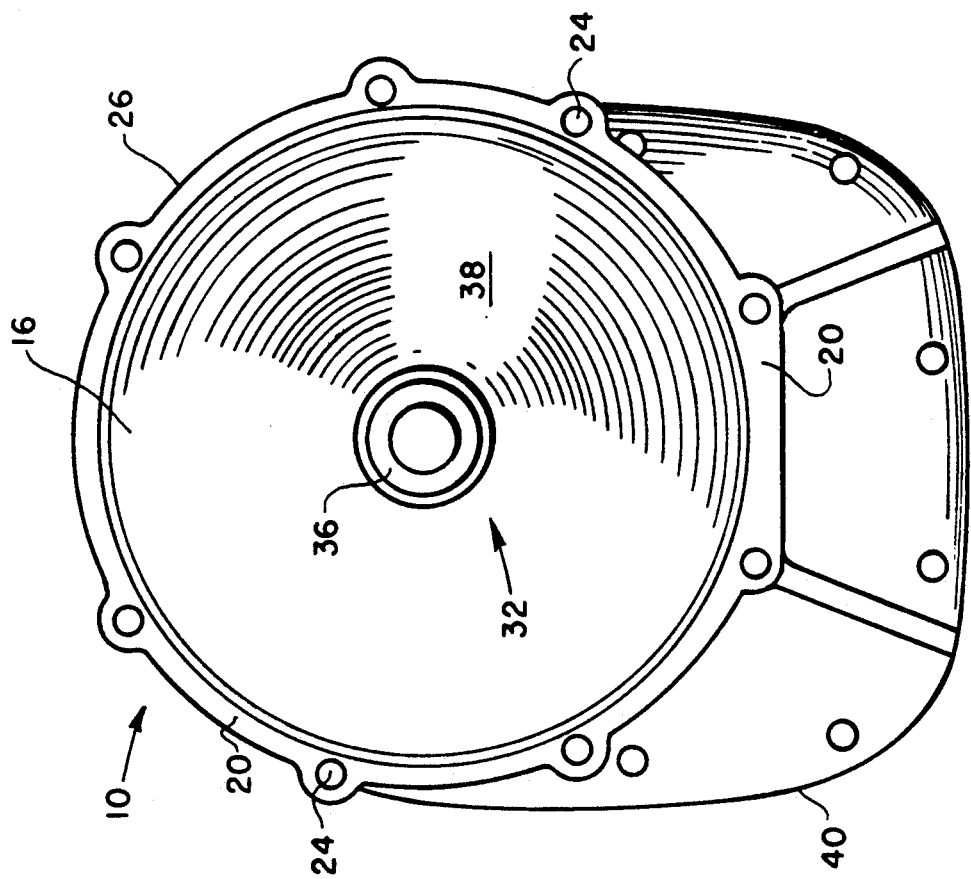

DRIVE TRAIN CONVERSION APPARATUS

BACKGROUND OF THE INVENTION

1. Field of the Invention

The present invention relates to a modification to the drive train of a vehicle. A novel housing and assembly using selected components enable installation of a torque converter in series with a clutch and manual transmission.

2. Description of the Prior Art

Vehicles having air-cooled engines, such as VOLKSWAGEN, have become highly popular with those enthusiasts wishing to make major modifications to the body and engine thereof. Kits providing restyled bodies intended for installation on a vehicle chassis are well known to the public, such as those made for use with vehicles manufactured by VOLKSWAGEN and bearing such informal names as "dune buggy", "rail buggy" and "Baja buggy", among others. Also, accessories enhancing performance of original engines have enjoyed widespread success.

Enhanced engine performance, particularly in the hands of drivers using the modified vehicle for recreational purposes, invariably leads to more strenuous demands on the vehicle than would general purpose driving. This is particularly noticeable in the areas of clutch life, clutches being particularly susceptible to premature or accelerated wear, and to constant velocity (CV) joint life. As in most motor vehicles, clutch and CV joint replacement are time consuming tasks, even to the capable mechanic. It is therefore a desirable attribute to provide superior clutch and CV joint longevity in a motor vehicle.

The arrangement of a torque converter in series with a clutch and manual transmission affords such superior longevity. Stall characteristics and internal hydraulic slippage obviate the use of the clutch in starting from a dead stop, if the torque converter be so employed, and soften the harshness of releasing a clutch under conditions of speed and torque, and mitigates shock that would otherwise be transmitted to the CV joints.

A torque converter provides a second benefit, of great interest to those drawn to engine performance. That is, torque multiplication provided by the torque converter improves acceleration, an improvement which will be greatly appreciated in a vehicle having limited engine output, even after performance tuning.

The prior art recognizes benefits accruing from providing a torque converter in series with a manually operated clutch. U.S. Pat. No. 3,517,789, issued to Joachim Gimmler et al. on Jun. 30, 1970, is representative of torque converters disposed in series with a manual clutch.

Performance modifications to VOLKSWAGEN vehicles are known, extending even to relocation of major power train components. U.S. Pat. No. 3,603,177, issued to Robert C. Burrows on Sep. 7, 1971, discloses a performance oriented engine to transmission adapter for a modified VOLKSWAGEN vehicle.

Neither of the above inventions and patents, taken either singly or in combination, is seen to describe the instant invention as claimed.

SUMMARY OF THE INVENTION

The present invention discloses a novel adapter housing and a modification employing specific drive train parts to provide a manually shifted transmission and a torque converter arranged in series. Vehicles being so modified generally include extensive body and running gear modification, in addition to power train modifications. Bodies are typically open at the passenger compartment, convertible style, and open at the rear to reveal the engine. Typically, oversized wheels and tires are installed. The resultant vehicle is generally used for recreational purposes, and ordinary considerations, such as cost and practicality, are ignored.

A preferred vehicle is any air-cooled, rear-engined passenger automobile sold under the trademark VOLKSWAGEN or PORSCHE, and manufactured in the period from the 1940's until 1992.

A preferred transmission for installation into such vehicles is found in the VOLKSWAGEN van, this transmission being constructed for more severe service and having gearing characteristics more suited to performance driving styles. However, this transmission lacks the flared bell housing that covers the clutch and bolts to the engine block.

The adapter housing provides the erstwhile lacking clutch cover and further spaces apart the engine and its associated bell housing from the transmission, thus providing additional space in which to house a clutch assembly which is installed in series with a torque converter. This spacing copes with the severe problem of great axial length inherent in providing both a clutch and a torque converter, a problem recognized by Gimmler et al. ('789). A stock torque converter, flex plate, and torque converter bell housing are employed, these components and the engine being displaced forwardly or rearwardly. This displacement is not objectionable in a vehicle having a significantly modified body.

The adapter housing also supports the clutch release bearing. The adapter housing provides a rigid member permitting solid connection of the transmission and of the engine/torque converter bell housing to one another.

The modification combines in a final assembly an engine having a flex plate, torque converter, and bell housing from a similar drive train originally equipped with an automatic transmission; a flywheel and clutch; the novel housing, enclosing the flywheel and clutch, and further supporting a release bearing; and a preferred manual transmission.

Accordingly, it is a principal object of the invention to provide an adapter housing accommodating a clutch and release bearing, the adapter housing being readily attachable to a bell housing from an automatic transmission and to a manual transmission.

It is another object of the invention to provide an adapter housing accommodating a clutch and release bearing, the adapter housing providing a structural member of sufficient strength to accommodate the weight of the engine and transmission in a drive train assembly, and sufficient to resist torques developed thereby.

It is a further object of the invention to provide necessary drive train parts to enable a vehicle drive train to be operably assembled to comprise a torque converter, clutch, and manually shifted transmission.

Still another object of the invention is to provide an adapter housing operably supporting a release bearing.

A still further object of the invention is to provide a clutch cover adapting a preferred manual transmission to the engine/torque converter bell housing.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 4A, 4B and 4C are a rear perspective view of the novel housing, a front elevational view of the same, and a side elevational view of the same, respectively.

Similar reference characters denote corresponding features consistently throughout the attached drawings.

DETAILED DESCRIPTION OF THE PREFERRED EMBODIMENT

Figure 1:
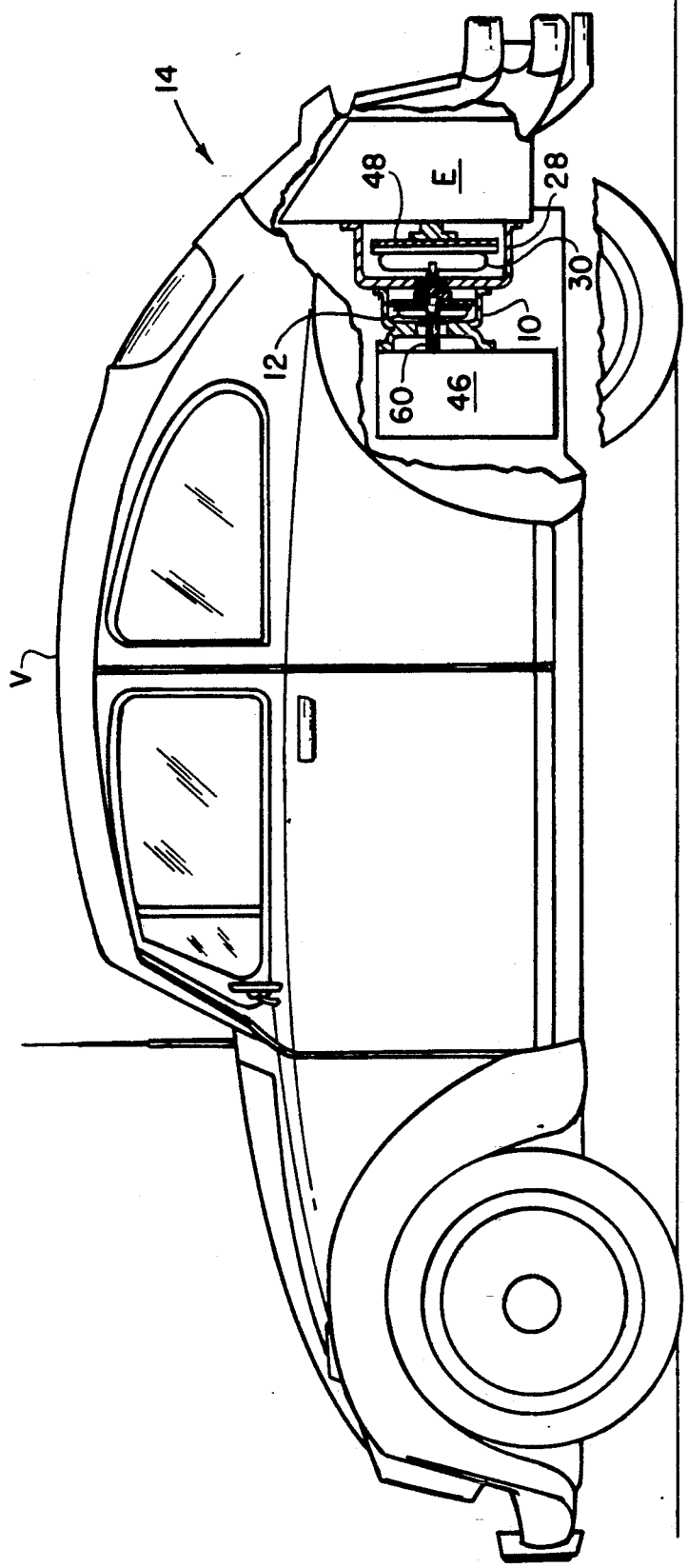
FIG. 1 is a partly cross sectional, partly schematic view of the invention, partly broken away to show detail.

The present invention comprises an adapter housing 10 enabling installation of a manually operated clutch 12 in a drive train originally intended to include an automatic transmission, and in the illustrated example utilizing a VOLKSWAGEN drive train, further comprises a specific selection of additional drive train components enabling operable assembly of a modified drive train 14. The adapter housing 10 is seen alone, free from associated components, in FIGS. 4A, 4B, and 4C. The rear elevational view of FIG. 4A ("front" and "rear being understood to refer to the vehicle front and rear") shows an open partial chamber 16 configured to house a clutch 12 and flywheel 18, and having a rearmost surface 20 configured to cooperate with, and bolt to, a corresponding bell housing front surface 22 (seen in FIG. 5). A plurality of rear bolt holes 24 formed in a circumferential, radially projecting flange 26 articulated in the adapter housing 10 corresponds in number, location and diameter to corresponding threaded fasteners F, holes H therefor, studs S or unthreaded dowels D provided in a bell housing 28 enclosing a torque converter 30.

A central orifice 32 formed in the adapter housing 10 is axially aligned with the engine crankshaft 34, and accommodates a clutch release bearing 36. The front side of the adapter housing 10 is shown in FIG. 4B, and comprises a vertical wall 38 having a front surface 40 and circumferential, radially projecting flange 42 with front bolt holes 44 being formed therein, the central orifice 32 also being visible. Front bolt holes 44 correspond to preexisting threaded fasteners F, holes H therefor, studs S or unthreaded dowels D provided in a manual transmission 46 incorporated into the present invention. The front vertical wall 38 seals the open rear of the manual transmission 46.

The adapter housing 10 also forms the partial chamber 16 enclosing the clutch 12 and flywheel 18. The adapter housing 10 is seen in the side elevational view of FIG. 4C to have limited, predetermined depth, the actual dimension in the case of a VOLKSWAGEN as illustrated being about 2.5 inches (6-7 cm).

Figure 5:
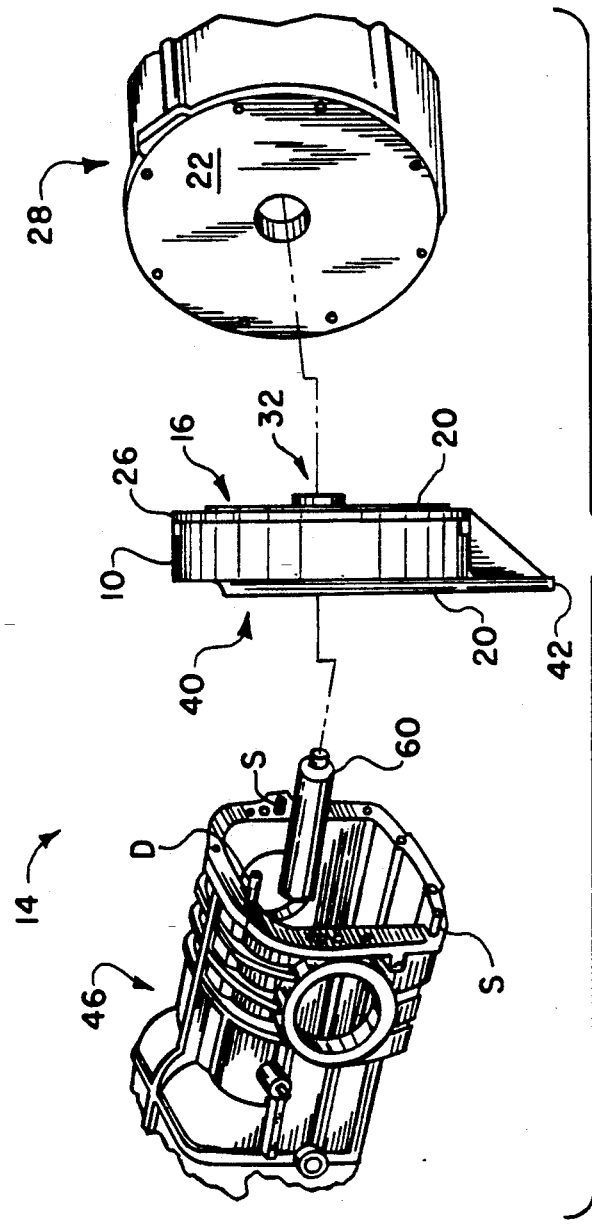
FIG. 5 is an exploded view of the novel housing showing its relation to other components of a vehicle.

As seen in FIG. 5, the adapter housing 10 is sandwiched between the bell housing 28 and the transmission 46, and bolts to both, the adapter housing front surface 40 mating flush with the transmission 46.

Referring now to FIG. 1, the entire drive train 44 is seen schematically mounted in a typical VOLKSWAGEN vehicle V. Although an unmodified factory body is illustrated, it will be understood that the modification of the present invention will be practiced on vehicles V having modified bodies (not shown). These bodies typically have open engine compartments, thus accommodating the rearward displacement of the engine E and bell housing B of 2.5 inches (6-7 cm) caused by installation of the adapter housing 10. Fig. 1 is representative only, and does not specifically show this accommodation.

Figure 2:
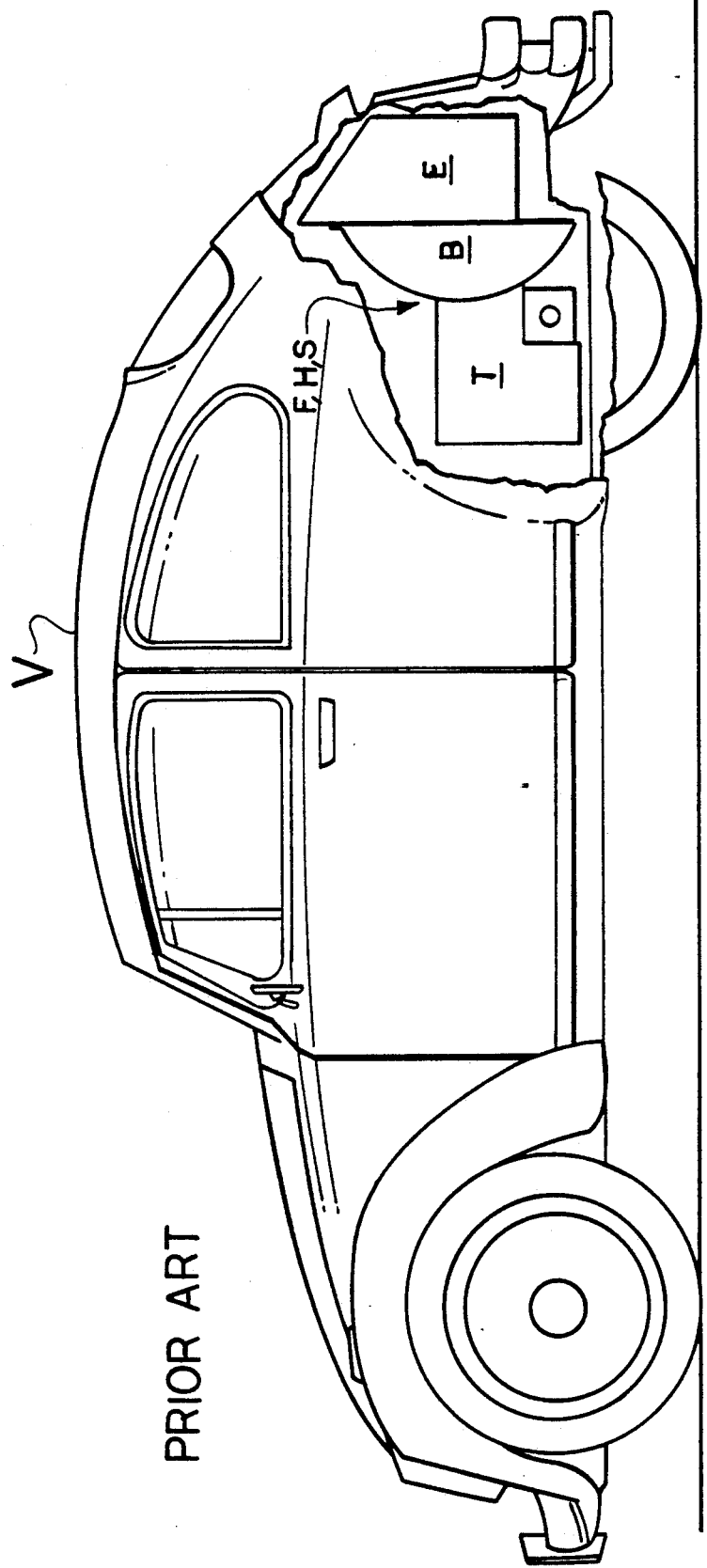
FIG. 2 is a view similar to FIG. 1, but showing the prior art.

This installation may be compared to the prior art vehicle V shown in FIG. 2. The prior art vehicle V has an engine E, bell housing B, and transmission T, the schematic representation applying equally to vehicles V equipped with manual or automatic transmission T. In vehicles V having a manual transmission T, the bell housing B encloses a flywheel and clutch (not shown). In vehicles V having an automatic transmission T, the bell housing B encloses a flex plate and torque converter (not shown). In both cases, the transmission T is of the manual type or of the automatic type, respectively.

Figure 3:
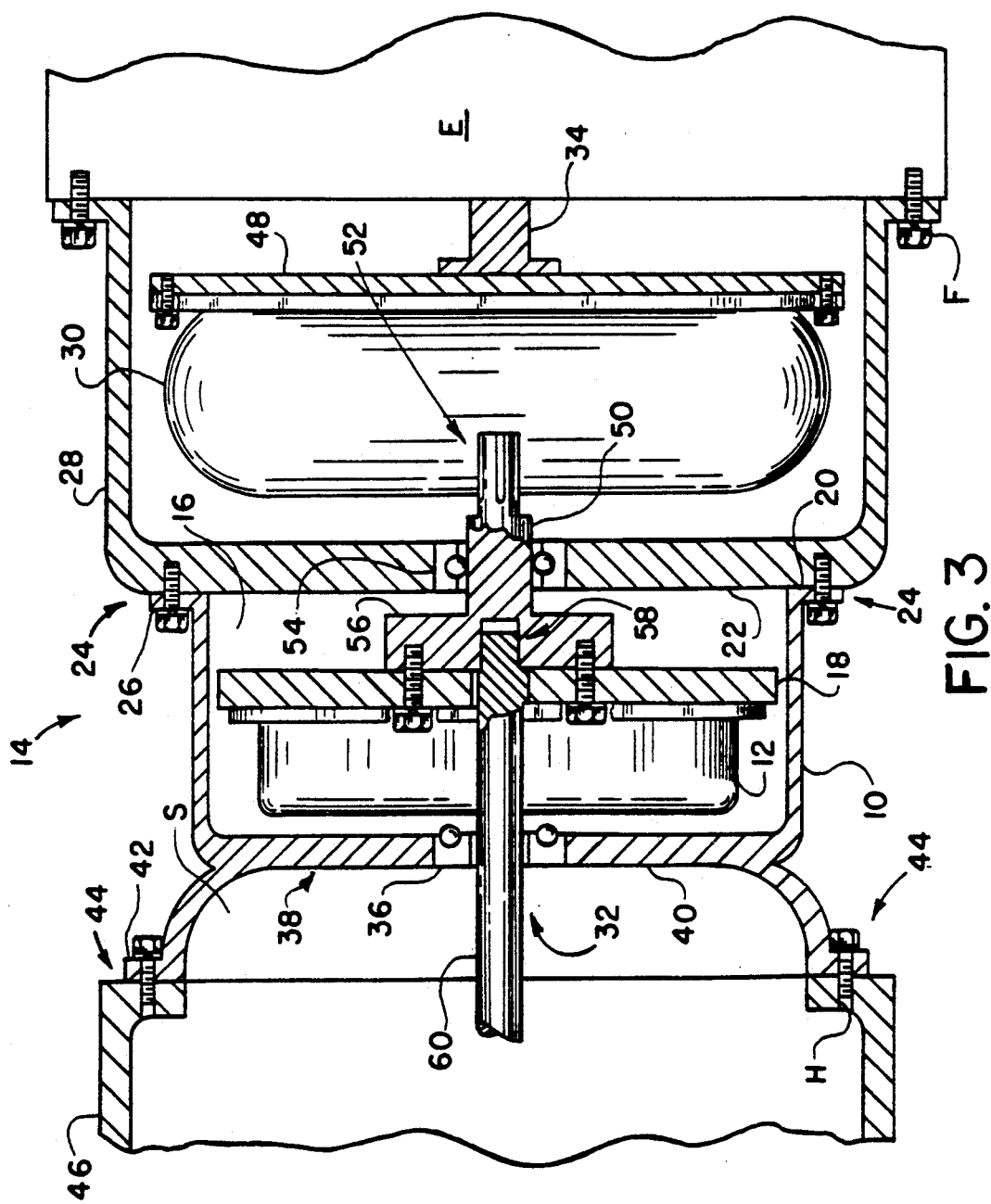
FIG. 3 is a cross sectional schematic view of the novel housing and attached components, drawn to enlarged scale.

Seen more clearly in enlarged scale in FIG. 3, the modified drive train 14 includes a conventional VOLKSWAGEN engine E, the crankshaft 34 projecting therefrom.

Hereinafter, the term early VOLKSWAGEN will be understood to encompass products manufactured by or officially subcontracted by, and sold to the general public by, VOLKSWAGEN AG, PORSCHE AG, or any of their respective foreign subsidiaries, these products being either parts or complete vehicles. These vehicles are further identified as being Type I, Type II, Type III or Type IV, these vehicles being manufactured in the period from the 1940's to 1992, and having rear-mounted, air-cooled engines. The term "compatible" as applied to early VOLKSWAGEN parts or vehicles will be understood to encompass parts intended for use on early VOLKSWAGEN vehicles, regardless of the manufacturer, these parts being configured for ready installation on early VOLKSWAGEN vehicles by hand tools, and not requiring cutting, welding, brazing, machining or other alteration to the exterior of the part in order to be readily installed.

The crankshaft 34 is conventional, supporting a flex plate 48. The flex plate 48 enables attachment of the torque converter 30 to the crankshaft 34. The flex plate 48, torque converter 30, and bell housing 28 are stock components originally designed for use with an automatic transmission. A clutch support shaft 50 penetrates and engages the torque converter splined hub 52, being driven thereby. The clutch support shaft 50 is supported by a bearing 54 mounted in the bell housing 28, and extends forward of this bell housing 28, terminating in a flange 56. The clutch support shaft 50 also has a pilot bearing 58 to support the transmission input shaft 60.

Figure 4C:
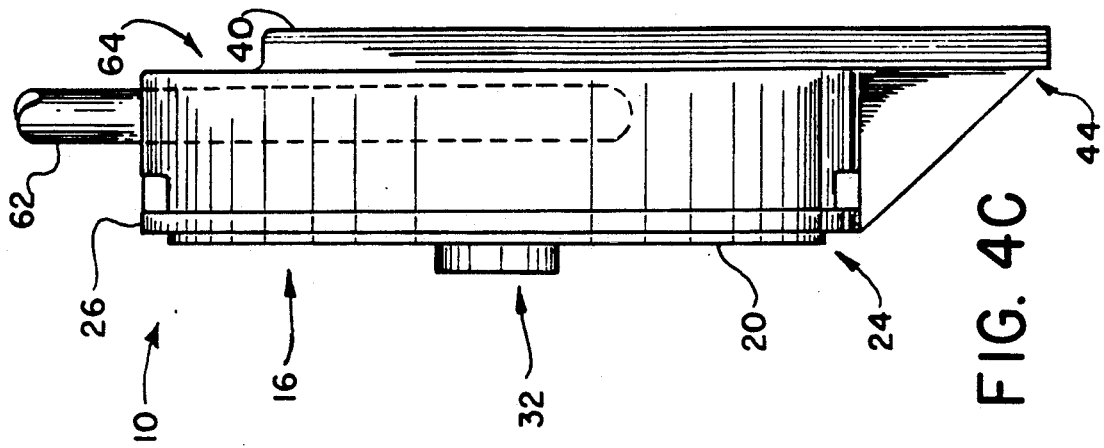

The flywheel 18 is suitably attached, as by bolts, to the clutch support shaft flange 56. The clutch 12 is operably secured to the flywheel 18 in conventional fashion, the release bearing 36 being carried on the adapter housing 10 and operating conventionally by apparatus including a lever (not shown) projecting from an operating shaft 62 housed in a bore 64 located in the adapter housing 10. Operating shaft 62 and bore 64 are shown in FIG. 4C. Thus, clutch operating means comprising the release bearing 36 and a clutch operating shaft 62 housed in a bore 64 are all provided integrally with the adapter housing 10.

An early VOLKSWAGEN manual transmission 46 is installed and bolted to the adapter housing 10. Preferably, the manual transmission 46 is of the type used in the early VOLKSWAGEN van, this transmission 46 being constructed for more severe service and having gearing characteristics more suited to performance driving styles. The original manual transmission input shaft (not shown) is replaced with a longer automatic transmission input shaft 60 to accommodate engine displacement discussed above.

The adapter housing 10 thus becomes a central component of a modified drive train 14, covering and enclosing the flywheel 18 and clutch 12, and sealing the open rear of the manual transmission 46. The vehicle V is thereby rendered drivable by conventional operation of the manual clutch 12 and manual transmission 46. If desired, the drive train 14 may be left in gear during stops, stall characteristics of the torque converter 30 disconnecting the idling engine E from the transmission gears (not shown). Concurrently, wear to the clutch 12 and CV joints (not shown) will be reduced as the torque converter 30 absorbs the harshness of application of torque to the transmission 46, and acceleration will be improved due to torque multiplication within the torque converter 30.

It is to be understood that the present invention is not limited to the sole embodiment described above, but encompasses any and all embodiments within the scope of the following claims.

We claim:

1. An adapter housing in combination with a preexisting drive train:
   said preexisting drive train comprising:
      an engine,
      a crankshaft,
      a torque converter,
      a bell housing partially enclosing said torque converter,
      a transmission,
      said bell housing having fastening means disposed thereon for attachment to said transmission,
      said transmission having fastening means for attachment thereon to said bell housing, and
      said drive train being converted to include a manually operated clutch, and
   said adapter housing comprising:
      a central vertical wall having an orifice axially aligned with a crankshaft, a transmission input shaft being passable therethrough, and means defining a first plurality of orifices therethrough, said first plurality of orifices corresponding in number, diameter and location to the transmission fasteners,
      a circumferential wall disposed upon and normal to said central vertical wall, a chamber open at one end being defined thereby, said first radial projections being located on an end of said circumferential wall opposite a circumferential wall end joining said central vertical wall, said first radial projections including means defining a second plurality of orifices therethrough, said second plurality of orifices corresponding in number, diameter, and location to the bell housing fasteners, whereby said adapter housing is interposed between the bell housing and the transmission, said adapter being fastened to both, thus providing a structurally unitary assembly, the clutch being installed within said adapter housing, and the drive train being converted to include the clutch in series with the torque converter.

2. The adapter housing in combination with a preexisting drive train according to claim 1, said circumferential wall radial projections projecting outwardly with respect to said open chamber.

3. The adapter housing in combination with a preexisting drive train according to claim 2, said adapter housing further including clutch operating means.

4. The adapter housing in combination with a preexisting drive train according to claim 1, said central vertical wall further having second radial projections projecting outwardly with respect to said open chamber, said second outward radial projections having means defining said first plurality of orifices.

5. The adapter housing in combination with a preexisting drive train according to claim 4, said adapter housing further including clutch operating means.

6. The adapter housing in combination with a preexisting drive train according to claim 1, said adapter housing further including clutch operating means.

7. The adapter housing in combination with a preexisting drive train according to claim 1, said fasteners being threaded fasteners.

8. An adapter housing in combination with a vehicle with an air-cooled, rear-mounted engine and being converted to have a torque converter and a manual transmission arranged in series, an adapter housing located between, connecting and attaching to a manual transmission and a torque converter bell housing, said adapter housing comprising:
   said adapter housing comprising:
      a central, vertical wall defining a central orifice therein, said central orifice being axially aligned with a crankshaft of said engine and a transmission input shaft being passable therethrough, said vertical central wall operably including a release bearing and further including means defining a bore, said means defining a bore supporting a release bearing operating shaft, said central wall having means defining a rear partial chamber therebehind,
      said means defining a partial chamber comprising a short, horizontal, circumferential wall, said circumferential wall having a first radial, circumferential projection having a surface abutting the bell housing on a cooperating bell housing surface, said first projection further having means defining fastener orifices therethrough, threaded fasteners, studs and dowels being passable therethrough, said fastener orifices corresponding in number, diameter, and location to preexisting fastener orifices, dowels and studs disposed in and on the bell housing cooperating surface, whereby said adapter housing is bolted to the bell housing,
      said adapter housing vertical central wall also having a forward surface abutting a cooperating rearward surface of a manual transmission, said forward facing wall further having a second circumferential radial projection including means defining transmission fastener orifices therethrough, said transmission fastener orifices corresponding in number, diameter, and location to preexisting fastener orifices and studs disposed in and on the cooperating transmission rearward surface, wherein said adapter housing is bolted to the transmission, the bell housing and its associated engine, said adapter housing and the transmission being bolted together to form a unitary, operable power train including:

an engine, a bell housing partially enclosing a torque converter mounted on a flex plate, a flywheel, and a clutch, a transmission input shaft, said adapter housing, and a manual transmission.

9. A drive train including a rear-engined, air-cooled engine and a crankshaft, including:

a flex plate mounted on said crankshaft of said engine, a torque converter mounted on said flex plate, a bell housing partially enclosing said flex plate and said torque converter, said bell housing being compatible with said engine, said flex plate and said torque converter, said bell housing having a forward surface, a clutch support shaft, a flywheel attached to said clutch support shaft, a clutch operably fastened to said flywheel, a manual transmission having an open rear end and a rearmost surface, a transmission input shaft compatible with automatic transmission, and an adapter housing located between, connecting and attaching to said manual transmission and to said torque converter bell housing, said adapter housing comprising:

a central, vertical wall defining a central orifice therein, said central orifice being axially aligned with said crankshaft and said transmission input shaft being passable therethrough, said vertical central wall operably including a release bearing and further including means defining a bore, said means defining a bore supportably including a release bearing operating shaft, said central wall having means defining a rear partial chamber therebehind, said means defining a partial chamber comprising a short, horizontal, circumferential wall, said circumferential wall having a first radial, circumferential projection having a surface abutting said bell housing on a cooperating bell housing surface, said first projection further having means defining fastener orifices therethrough, said fastener orifices corresponding in number, diameter, and location to preexisting fastener orifices, dowels and studs disposed in and on said bell housing forward surface, whereby said adapter housing is bolted to said bell housing, said adapter housing vertical central wall also having a forward facing surface abutting said transmission rearmost surface, said forward facing surface further having a second circumferential radial projection including means defining transmission fastener orifices therethrough, said transmission fastener orifices corresponding in number, diameter, and location to preexisting fastener orifices and studs disposed in and on said cooperating transmission rearward surface, whereby said adapter housing is bolted to said transmission, whereby said manual transmission, said clutch and said torque converter are operably arranged in series, wear of said clutch being mitigated by said torque converter, and power characteristics of said rear-mounted, air-cooled engine being enhances by said torque converter, said drive train remaining operable by said manual transmission and said clutch.

* * * * *